Patented Sept. 13, 1927.

1,642,594

UNITED STATES PATENT OFFICE.

GRIGORI PETROFF, OF MOSCOW, RUSSIA, AND PETER SHESTAKOFF, OF PARIS, FRANCE.

PROCESS OF TREATING HARD WATER.

No Drawing.  Application filed December 30, 1925. Serial No. 78,489.

This invention relates to processes for treating water and it comprises a process in which "hard" water, that is, water which contains in solution, salts of alkaline earth metals, is treated with high molecular weight sulphonic acids for the purpose of "softening" the water.

Various processes for softening hard water have been proposed. Base exchanging substances such as permutite and other artificial zeolites have been used in great quantities. These substances, of course, act in such a way that the calcium and magnesium salts contained in the hard water are replaced by sodium salts; the calcium and magnesium salts become a part of the permutite at the expense of the sodium. Other processes have been proposed in which the hard water is treated before use by adding to it soluble salts to precipitate the dissolved calcium and magnesium compounds which give the water its hard characteristics. It is to be noted that all of these processes contemplate softening the water before it is put into industrial use.

We have discovered a way in which hard water, that is, water containing calcium and magnesium salts in solution, usually in the form of their bicarbonates, may be softened without the necessity of using base exchanging substances and without the necessity of adding salts to the water to precipitate the calcium and magnesium salts as insoluble carbonates, which latter process requires filtering out the insoluble precipitated calcium and magnesium salts.

We have found, that the addition of high molecular weight sulphonic acids to the hard water, in sufficient quantity to react with all of the calcium and magnesium present in the water to form calcium and magnesium sulphonates, will completely soften the water. Furthermore it is unnecessary to remove the calcium and magnesium sulphonates so formed prior to the use of the water in laundries, dyeing, flax wetting, etc. This, we have discovered, is due to the fact that the calcium and magnesium sulphonates so formed, while they are insoluble in the water, remain in a colloidal, or ultra-microscopic state and do not have any undesirable effects on the materials treated with the softened water. Such water, softened by the addition of high molecular weight sulphonic acids, may be used in many cases in lieu of distilled water.

The chemical reactions occurring in hard water when high molecular weight sulphonic acids are added thereto are comparatively simple. All of the alkaline earth metal carbonates and bicarbonates are decomposed by the sulphonic acids with the formation of alkaline earth metal sulphonates and the liberation of carbon dioxide. With calcium bicarbonates, for instance, the calcium salt of the high molecular weight sulphonic acid is formed and, though it is insoluble, it remains in the solution in a colloidal state. With calcium salts and salts of even higher valency, corresponding sulphonates are formed.

It will thus be seen that our process for softening water merely consists in adding a high molecular weight sulphonic acid to the hard water in sufficient quantity to react with all of the hardening constituents, that is, the calcium and magnesium salts, to form corresponding sulphonates. In this way the water is effectively softened without the necessity of filtering operations.

The high molecular weight sulphonic acids which we have found suitable are those derived from the sulphonation of various oils and aromatic compounds, such as, naphtha distillates, aromatic hydrocarbons, phenols, turpentine oil, distillates derived from brown-coal tar, etc. And by high molecular weight sulphonic acids in the description and in the appended claims we mean to include sulphonic acid derivatives of these substances. Most of the sulphonates are of uncertain constitution, but they are all derived by sulphonating various comparatively high molecular weight aliphatic and aromatic hydrocarbons.

The quantity of sulphonic acids to be added to the hard water, of course, depends upon the degree of hardness. As a practical matter, a quantity of sulphonic acids must be added to the water sufficient to react with all of the hydroxides, carbonates, and bicarbonates of magnesium, calcium, iron and other hardening constitutents contained in the water. In order to be sure that the water is completely softened, it is advantageous to add the sulphonic acids in such quantity that a further addition would cause a weak acid reaction with methyl-orange indicator.

The particular sulphonic acids employed may be derived from aromatic or aliphatic sources. In every case however, those sulphonic acids which are suitable will be such acids as will give insoluble alkaline earth metal salts capable of remaining in the colloidal state in water.

What we claim is:

1. In the process of softening hard water, the step which comprises treating the water with high molecular weight sulphonic acids.

2. In the process of softening hard water, the step which comprises adding high molecular weight sulphonic acids to the water in quantity sufficient to react with all of the alkaline earth metal salts dissolved in said water to form alkaline earth metal sulphonates.

3. In the process of softening hard water, the step which comprises adding aromatic sulphonic acids to said water in quantity sufficient to react with all of the hardening constituents in said water to form colloidal metallic sulphonates but in quantity insufficient to give more than a faintly acid reaction to the water.

4. In the process of softening hard water the step which comprises adding a small quantity of naphthol sulphonic acid to said water in quantity sufficient to react with all the hardening constituents in said water, and leave the water neutral.

In testimony whereof we affix our signatures.

GRIGORI PETROFF.
PETER SHESTAKOFF.